(12) United States Patent
Nagubhai et al.

(10) Patent No.: US 8,369,829 B2
(45) Date of Patent: Feb. 5, 2013

(54) PREPAID BILLING SOLUTIONS FOR PUSH-TO-TALK IN A WIRELESS COMMUNICATIONS NETWORK

(75) Inventors: Narasimha Raju Nagubhai, Richardson, TX (US); Ravi Shankar Kumar, Plano, TX (US); Krishnakant M. Patel, Richardson, TX (US); Ravi Ayyasamy, Richardson, TX (US)

(73) Assignee: Kodiak Networks, Inc., San Ramon, CA (US)

( * ) Notice: Subject to any disclaimer, the term of this patent is extended or adjusted under 35 U.S.C. 154(b) by 0 days.

(21) Appl. No.: 13/039,635

(22) Filed: Mar. 3, 2011

(65) Prior Publication Data
US 2011/0217949 A1 Sep. 8, 2011

Related U.S. Application Data (60) Provisional application No. 61/310,245, filed on Mar. 3, 2010.

(51) Int. Cl.
*H04M 11/00* (2006.01)
(52) U.S. Cl. ........ 455/406; 455/405; 455/415; 455/428; 455/439; 455/445
(58) Field of Classification Search .................. 455/405, 455/406, 428, 432.1–439
See application file for complete search history.

(56) References Cited

U.S. PATENT DOCUMENTS

| | | | |
|---|---|---|---|
| 3,912,874 A | 10/1975 | Botterell et al. | |
| 4,796,293 A | 1/1989 | Blinken et al. | |
| 5,353,328 A | 10/1994 | Jokimies | |
| 5,442,809 A | 8/1995 | Diaz et al. | |
| 5,546,449 A | 8/1996 | Hogan et al. | |
| 5,711,011 A | 1/1998 | Urs et al. | |
| 5,987,318 A | 11/1999 | Alperovich et al. | |
| 5,987,331 A | 11/1999 | Grube et al. | |
| 6,011,976 A | 1/2000 | Michaels et al. | |

(Continued)

FOREIGN PATENT DOCUMENTS

| | | |
|---|---|---|
| GB | 2338150 | 12/1999 |
| JP | 2003-92776 | 3/2003 |

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

(Continued)

*Primary Examiner* — Dai A Phuong
(74) *Attorney, Agent, or Firm* — Gates & Cooper LLP (57) ABSTRACT

Advanced group services for use in a mobile phone network include a prepaid billing solution. In the mobile phone network, a real-time exchange interfaces to at least one mobile switching center to provide the advanced group services therein. Both the real-time exchange and the mobile phones that use the advanced group services communicate with each other using call setup and in-band signaling within the mobile phone network, wherein the real-time exchange switches the voice frames for the advanced group services between the mobile phones across bearer paths and through at least one mobile switching center in the mobile phone network. A real-time billing mechanism is provided for a prepaid subscriber of the advanced group services. The real-time billing mechanism may use a prefix-based billing solution or a charging number based billing solution.

17 Claims, 3 Drawing Sheets

U.S. PATENT DOCUMENTS

| | | | |
|---|---|---|---|
| 6,021,326 A | 2/2000 | Nguyen | |
| 6,138,011 A | 10/2000 | Sanders, III et al. | |
| 6,192,119 B1 | 2/2001 | Wilson | |
| 6,304,558 B1 | 10/2001 | Mysore | |
| 6,397,054 B1 | 5/2002 | Hoirup et al. | |
| 6,405,030 B1 | 6/2002 | Suprunov | |
| 6,411,815 B1 | 6/2002 | Balasuriya | |
| 6,477,366 B1 | 11/2002 | Valentine et al. | |
| 6,477,387 B1 | 11/2002 | Jackson et al. | |
| 6,549,773 B1 | 4/2003 | Linden et al. | |
| 6,577,874 B1 | 6/2003 | Dailey | |
| 6,606,305 B1 | 8/2003 | Boyle et al. | |
| 6,628,937 B1 | 9/2003 | Salin | |
| 6,661,878 B1 | 12/2003 | Mirashrafi et al. | |
| 6,751,468 B1 | 6/2004 | Heubel et al. | |
| 6,801,762 B1 | 10/2004 | Huilgol | |
| 6,856,676 B1 | 2/2005 | Pirot et al. | |
| 6,865,398 B2 | 3/2005 | Mangal et al. | |
| 6,892,074 B2 | 5/2005 | Tarkiainen et al. | |
| 6,895,254 B2 | 5/2005 | Dorenbosch | |
| 6,898,436 B2 | 5/2005 | Crockett et al. | |
| 6,996,414 B2 | 2/2006 | Vishwanathan et al. | |
| 7,026,926 B1 | 4/2006 | Walker, III | |
| 7,043,266 B2 | 5/2006 | Chaturvedi et al. | |
| 7,085,364 B1 | 8/2006 | Ahmed et al. | |
| 7,099,291 B2 | 8/2006 | Harris et al. | |
| 7,170,863 B1 | 1/2007 | Denman et al. | |
| 7,231,225 B2 | 6/2007 | Rao et al. | |
| 7,236,580 B1 | 6/2007 | Sarkar et al. | |
| 7,366,535 B2 | 4/2008 | Glass et al. | |
| 7,403,775 B2 | 7/2008 | Patel et al. | |
| 7,529,557 B2 | 5/2009 | Farrill | |
| 7,689,238 B2 | 3/2010 | Biswas et al. | |
| 7,738,892 B2 | 6/2010 | Ayyasamy et al. | |
| 7,738,896 B2 | 6/2010 | Patel et al. | |
| 7,764,950 B2 | 7/2010 | Patel et al. | |
| 7,787,896 B2 | 8/2010 | Kundu et al. | |
| 7,813,722 B2 | 10/2010 | Patel et al. | |
| 2001/0005372 A1 | 6/2001 | Cave et al. | |
| 2002/0077136 A1 | 6/2002 | Maggenti et al. | |
| 2002/0086659 A1 | 7/2002 | Lauper | |
| 2002/0102989 A1 | 8/2002 | Calvert et al. | |
| 2002/0196781 A1 | 12/2002 | Salovuori | |
| 2003/0016632 A1 | 1/2003 | Refai et al. | |
| 2003/0017836 A1 | 1/2003 | Vishwanathan et al. | |
| 2003/0078064 A1 | 4/2003 | Chan | |
| 2003/0148779 A1 | 8/2003 | Aravamudan et al. | |
| 2003/0153343 A1 | 8/2003 | Crockett et al. | |
| 2003/0190888 A1 | 10/2003 | Mangal et al. | |
| 2004/0032843 A1 | 2/2004 | Schaefer et al. | |
| 2004/0057449 A1 | 3/2004 | Black | |
| 2004/0067751 A1 | 4/2004 | Vandermeijden et al. | |
| 2004/0095954 A1 | 5/2004 | Varney et al. | |
| 2004/0152441 A1 | 8/2004 | Wong | |
| 2004/0179531 A1 | 9/2004 | Bi et al. | |
| 2004/0196826 A1 | 10/2004 | Bao et al. | |
| 2004/0203793 A1 | 10/2004 | Dorenbosch | |
| 2004/0224710 A1 | 11/2004 | Koskelainen et al. | |
| 2004/0228292 A1 | 11/2004 | Edwards | |
| 2004/0259580 A1 | 12/2004 | Florkey et al. | |
| 2005/0047362 A1 | 3/2005 | Harris et al. | |
| 2005/0101308 A1 | 5/2005 | Lee | |
| 2005/0111430 A1 | 5/2005 | Spear et al. | |
| 2005/0143135 A1 | 6/2005 | Brems et al. | |
| 2005/0164737 A1 | 7/2005 | Brown | |
| 2005/0189337 A1 | 9/2005 | Baune | |
| 2005/0192041 A1 | 9/2005 | Oxley et al. | |
| 2005/0202807 A1 | 9/2005 | Ayyasamy et al. | |
| 2005/0221819 A1 | 10/2005 | Patel et al. | |
| 2005/0232241 A1 | 10/2005 | Wu et al. | |
| 2005/0239485 A1 | 10/2005 | Kundu et al. | |
| 2005/0254464 A1 | 11/2005 | Patel et al. | |
| 2005/0261016 A1 | 11/2005 | Patel et al. | |
| 2006/0003751 A1 | 1/2006 | Vo | |
| 2006/0019654 A1 | 1/2006 | Farrill | |
| 2006/0029189 A1 | 2/2006 | Patel et al. | |
| 2006/0030347 A1 | 2/2006 | Biswas | |
| 2006/0056361 A1 | 3/2006 | Jiang et al. | |
| 2006/0078064 A1 | 4/2006 | Schmidt et al. | |
| 2006/0094455 A1 | 5/2006 | Hannu et al. | |
| 2006/0116150 A1 | 6/2006 | Bhutiani | |
| 2006/0189337 A1 | 8/2006 | Farrill et al. | |
| 2006/0234687 A1 | 10/2006 | Patel et al. | |
| 2007/0037597 A1 | 2/2007 | Biswas et al. | |
| 2007/0037598 A1 | 2/2007 | Ayyasamy et al. | |
| 2007/0190492 A1* | 8/2007 | Schmitt | 433/213 |
| 2007/0190984 A1 | 8/2007 | Ayyasamy et al. | |
| 2007/0197234 A1 | 8/2007 | Gill et al. | |
| 2007/0217591 A1 | 9/2007 | Yasuma | |
| 2007/0253347 A1 | 11/2007 | Patel et al. | |
| 2008/0064364 A1 | 3/2008 | Patel et al. | |
| 2008/0126230 A1* | 5/2008 | Bellora et al. | 705/32 |
| 2009/0092116 A1 | 4/2009 | Jiang et al. | |
| 2009/0119678 A1 | 5/2009 | Shih et al. | |
| 2009/0149167 A1 | 6/2009 | Patel et al. | |
| 2009/0209235 A1 | 8/2009 | Lawler et al. | |
| 2010/0142414 A1 | 6/2010 | Patel et al. | |
| 2010/0190492 A1* | 7/2010 | Jiang | 455/432.1 |
| 2010/0234018 A1 | 9/2010 | Lawler et al. | |

FOREIGN PATENT DOCUMENTS

| | | |
|---|---|---|
| WO | 00/69189 | 11/2000 |
| WO | 00/79825 | 12/2000 |
| WO | 01/67674 | 9/2001 |
| WO | 02/101981 | 12/2002 |
| WO | 03/101007 | 12/2003 |
| WO | 2005/009006 | 1/2005 |
| WO | 2005/112494 | 11/2005 |
| WO | 2005/115032 | 12/2005 |
| WO | 2005/117474 | 12/2005 |
| WO | 2006/105287 | 10/2006 |
| WO | 2010/048217 | 4/2010 |
| WO | 2010/117815 | 10/2010 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", TRACKWELL.COM, Oct. 2002, pp. 1-1. XP002345781 http://www.trackwell.com/news/news_twandtetra.htm.

* cited by examiner

PREPAID BILLING SOLUTIONS FOR PUSH-TO-TALK IN A WIRELESS COMMUNICATIONS NETWORK

CROSS REFERENCE TO RELATED APPLICATIONS

This application claims the benefit under 35 U.S.C. Section 119(e) of the following co-pending and commonly-assigned patent application:

U.S. Provisional Application Ser. No. 61/310,245, filed on Mar. 3, 2010, by Narasimha Raju Nagubhai, Ravi Shankar Kumar, Krishnakant M. Patel and Ravi Ayyasamy, entitled "PREPAID BILLING SOLUTIONS AND OTHER ENHANCEMENTS FOR PUSH-TO-TALK,"

which application is incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981, 60/383,179 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268;

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat. No. 7,689,238, issued Mar. 30, 2010, which application claims the benefit under 35 U.S.C. Section 119(e) of U.S. Provisional Application Ser. No. 60/705,115;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521;

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," which application claims the benefit under 35 U.S.C. Section 119(e) of U.S. Provisional Application Ser. No. 61/023,332;

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," which application claims the benefit under 35 U.S.C. Section 119(e) of U.S. Provisional Application Ser. No. 61/106,689;

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," which application is a continuation-in-part and claims the benefit under 35 U.S.C. Sections 119, 120 and/or 365 of U.S. Utility application Ser. No. 12/582,601;

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," which application claims the benefit under 35 U.S.C. Section 119(e) of U.S. Provisional Application Ser. Nos. 61/164,754 and 61/172,129;

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896;

all of which applications are incorporated by reference herein.

BACKGROUND OF THE INVENTION

1. Field of the Invention

This invention relates in general to wireless communications systems, and more specifically, to prepaid billing solutions for push-to-talk in wireless communications networks.

2. Description of Related Art

Advanced Voice Services (AVS), also known as Advanced Group Services (AGS), such as two-way half-duplex voice calls within a group, also known as Push-to-Talk (PTT) or Press-to-Talk (P2T), as well as other AGS functions, such as Push-to-Conference (P2C) or Instant Conferencing, Push-to-Message (P2M), etc., are described in the co-pending and commonly-assigned patent applications cross-referenced above and incorporated by reference herein. These AGS functions have enormous revenue earnings potential for wireless communications systems, such as mobile phone networks.

Currently, there are three major approaches employed in providing PTT or other AGS in wireless communications systems. One approach requires the installation of a dedicated private network, parallel to the wireless communications system, to support the group-based voice services. NEXTEL uses such a system, based on a solution developed by MOTOROLA known as IDEN. However, a dedicated private network is costly to install and maintain and is employed by a few public wireless carriers. Also, the IDEN system is non-standard, and hence cannot be used in standard wireless communications networks, such as those based on GSM (Global System for Mobile Communications) and CDMA (Code Division Multiple Access).

Another approach is based on Voice over IP (VoIP) technologies. While this approach promises compliance with newer and emerging standards, such as GPRS (General Packet Radio Service), UMTS (Universal Mobile Telecommunications System), etc., it does not provide a solution for carriers employing wireless communications systems based on existing standards, such as GSM, CDMA, etc. However, even for the newer standards, solutions based on VoIP have serious drawbacks, including slower call setup, significant overhead, increased susceptibility to packet losses, low bit rate voice coders, and significant modifications to the mobile handset.

Still another approach is the innovative approach described in the co-pending and commonly-assigned patent applications cross-referenced above and incorporated by reference herein. In this approach, advanced voice services are provided by a real-time exchange (RTX), also known as a dispatch gateway (DG), that interfaces to the wireless communications system to provide the advanced voice services therein, wherein both the real-time exchange and mobiles that use the advanced voice services communicate with each other using call setup and in-band signaling within the wireless communications system.

However, notwithstanding the innovations described in the co-pending and commonly-assigned patent applications cross-referenced above, there is a need in the art for improvements to these advanced voice services, as well as additional advanced voice services, that comply with existing and emerging wireless standards and provide superior user experiences. The present invention aims to satisfy this need by providing improved group-based communications services for wireless communications systems.

SUMMARY OF THE INVENTION

To overcome the limitations in the prior art described above, and to overcome other limitations that will become apparent upon reading and understanding the present specification, the present invention discloses prepaid billing solutions for advanced voice services in a mobile phone network. A mobile phone network is used for making calls between mobile phones, wherein the calls are initiated by call setup and in-band signaling within the mobile phone network and voice frames for the calls are switched between the mobile phones by at least one mobile switching center across bearer paths in the mobile phone network. A real-time exchange interfaces to at least one mobile switching center in the mobile phone network to provide the advanced group services therein. Both the real-time exchange and the mobile phones that use the advanced group services communicate with each other using the call setup and in-band signaling within the mobile phone network, and the real-time exchange switches the voice frames for the advanced group services between the mobile phones across the bearer paths and through at least one mobile switching center in the mobile phone network. A real-time billing mechanism is provided for a prepaid subscriber of the advanced group services. The real-time billing mechanism may use a prefix-based billing solution for the advanced group services used by the prepaid subscriber, such that the prefix is placed on numbers for one or more terminating legs of the call, so that the prepaid subscriber is billed for the terminating legs. The real-time billing mechanism may also use a charging number based billing solution for the advanced group services used by the prepaid subscriber.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a Prepaid Billing Solution for PTT and other AGS that enables a real-time billing mechanism for a prepaid subscriber in a wireless communications network, as well as a suite of applications, both within the network and within the mobile handsets used in the network, that provide this solution. The innovative features of this solution are described below.

2 System Description 2.1 Overview

The following illustration explains the network reference architecture used to provide a Prepaid Billing Solution for PTT and other AGS. The PTT and other AGS are provided without any changes to the existing network infrastructure, but merely the addition of a service control point (SCP), known as a Real-Time Exchange (RTX), connected to the network and a client application embedded in the handset (although a clientless version is provided as well).

2.2 Network Architecture

Figure 1:
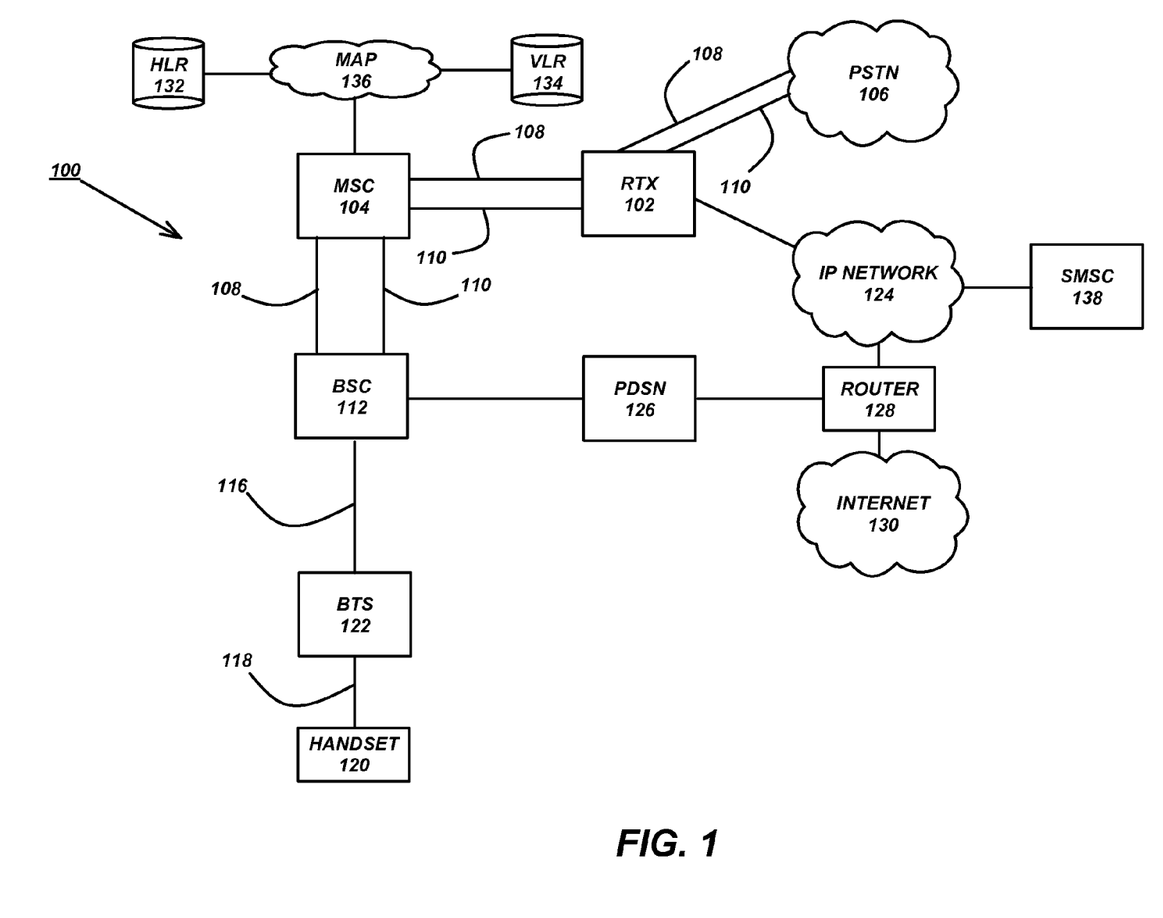
FIG. 1 is a block diagram that illustrates an exemplary embodiment of a wireless communications network according to a preferred embodiment of the present invention.

FIG. 1 is a block diagram that illustrates an exemplary embodiment of a wireless communications network according to a preferred embodiment of the present invention.

Within the network 100, an RTX 102, also known as a Dispatch Gateway (DG), communicates with a MSC (Mobile Switching Center) 104, which my be a Gateway MSC (GMSC) 104, and PSTN (Public Switched Telephone Network) 106 using SS7-ISUP/WIN/CAMEL (Signaling System 7-Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of an AGS call. The use of TFO ensures high voice quality (as voice vocoder conversion is avoided) between mobile-to-mobile calls.

When a subscriber originates an AGS call, the MSC 104 routes the call to the RTX 102. The MSC 104 also requests the BSC 112 via 116 to establish a radio traffic path 118 with a mobile station (MS) 120 (also known as a handset or mobile unit) via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the group call request to the RTX 102), the RTX 102 identifies the terminating group users and their numbers, which may comprise an MSISDN (Mobile Station-Integrated Services Digital Network) number, an IMSI (International Mobile Subscriber Identity) number, or an MDN (Mobile Directory Number).

The RTX 102 sends an ISUP call origination request for each terminating MS 120. It may send requests directly to the MSC 104, PSTN 106 or IP network 124 via a PDSN (Public Data Switched Network) 126, Router 128, and/or Internet/Intranet 130, depending on the routing table configuration for terminating numbers. Once the bearer path 110 is established, the RTX 102 begins a negotiation with the far end (in this case, the terminating BSC 112) for each terminating leg to an MS 120.

Once bearer paths 110 are established for originating and terminating legs for an AGS call, the RTX 102 switches (or duplicates) voice or data from the originating MS 120 to all terminating MS's 120.

The RTX 102 may also use an IP network 124 or the Internet/Intranet 130. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration and presence application. Since the MSC 104 will not direct a registration request from a MS 120 to the RTX 102 (because it would require changes in the MSC 104), the latter does not have any information of the registered MS 120. To circumvent this issue, a registration and presence application runs over an IP stack in the MS 120. After the MS 120 registers for a data interface (i.e., obtaining an IP address) with the PDSN 126 (or Serving GSM Service Nodes (SGSN) in the case of GSM networks), the registration and presence application in the MS 120 registers with the RTX 102 using its IP address. The RTX 102 also uses this IP interface to update the presence information of other group members to an MS 120.

An alternative embodiment may use the SMS (Short Message Service) transport to carry presence messages over a data channel. The RTX 102 interacts with the MS 120 using predefined presence application related messages that are transported as SMS messages. The same messages can be transported via the PDSN 126 interface, if group users have data service.

During roaming, a Home Location Register (HLR) 132 and Visitor Location Register (VLR) 134 can be accessed via the MSC 104 and a MAP link 136. The HLR 132 and VLR 134 are used to track the mobile handsets 120 within home or foreign networks, while the RTX 102 is used to track the presence of members of a group within the home or foreign networks and updates the mobile handsets 120 for those members with the network availability of other members of the group.

A Short Message Service Center (SMSC) 138 is accessible via the IP network 124 (or other element) for the storage of text messages (SMS messages). When an SMS message is sent to an MS 120, the message is first stored in the SMSC 138 until the recipient MS 120 is available (e.g., a store-and-forward option).

2.3 Real Time Exchange

Figure 2:
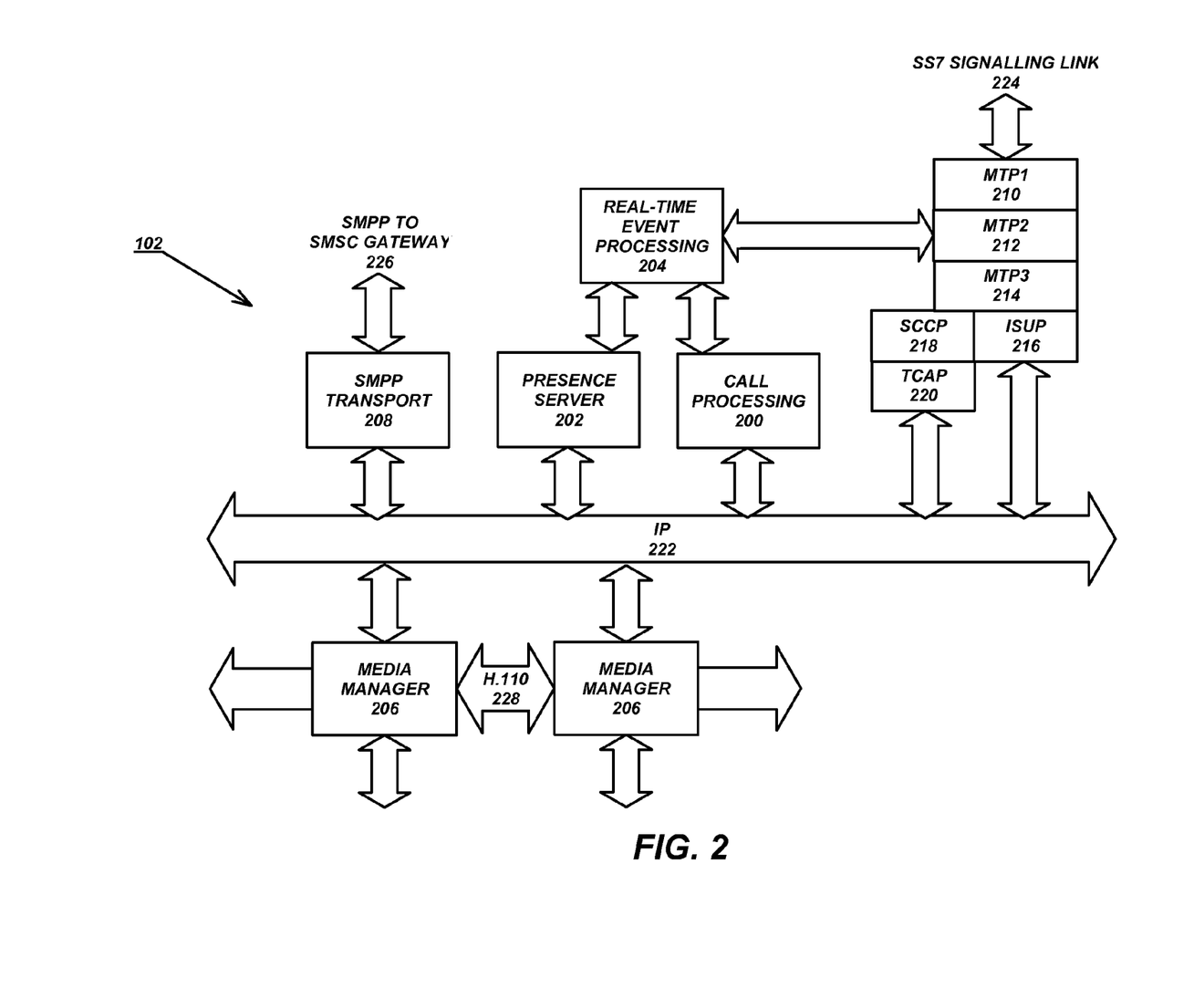
FIG. 2 illustrates a proposed architecture for a Real-Time Exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228 (or some other protocol, such TCP/IP).

The operation of these various components are described in more detail below, as well as in the co-pending and commonly-assigned patent applications cross-referenced above and incorporated by reference herein.

The originating MS 120 signals the RTX 102 via the wireless network 100, e.g., by transmitting one or more configured DTMF (Dual Tone Multi Frequency) digits to the RTX 102. The Media Manager systems 206 receive the DTMF digits and pass the DTMF digits to the Call Processing system 200. The Call Processing (CP) system 200 determines whether the originating MS 120 has subscribed to the AGS service before originating the AGS call. Upon confirmation, the Call Processing system 200 initiates a new AGS call. The Call Processing system 200 interacts with the Presence Server 202 and Real-Time Event Processing system 204 to cause the wireless network 100 to perform call setup with the terminating MS's 120 for the AGS call, and thereafter to manage the AGS call.

During the AGS call, the Call Processing system 200 interacts with the Media Manager systems 206 to maintain the H.110 channels 227 and assign any additional H.110 channels 228 required for the AGS call, which may span across multiple Media Manager systems 206. During the AGS call, the Media Manager systems 206 of the RTX 102 are used to mix audio streams between the originating MS 120 and the terminating MS 120, and then deliver these mixed audio streams to the originating MS 120 and the terminating MS 120. The H.110 channels 228 are used for passing mixed and unmixed audio streams voice between the Media Manager systems 200 as required.

2.4 Mobile Station Components

Figure 3:
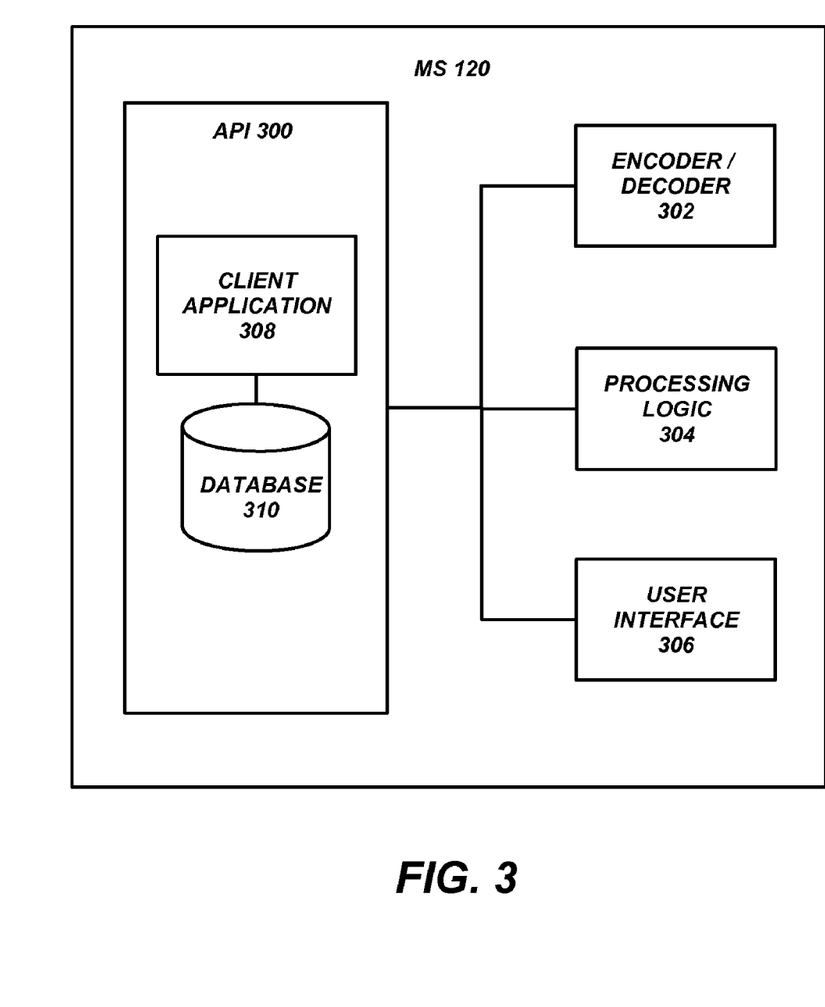
FIG. 3 illustrates the high-level functional components and their interfaces in a mobile station or handset according to a preferred embodiment of the present invention.

FIG. 3 illustrates the high-level functional components and their interfaces in the MS 120 according to a preferred embodiment of the present invention. In one embodiment, the software architecture used in the MS 120 is based on an Open OS implementation and is available under multiple operating systems, including JAVA, WINDOWS MOBILE, SYMBIAN, BREW, iOS, and ANDRIOD.

Preferably, the software architecture used in the MS 120 provides an application programming interface (API) 300 that supports the logic and data required within the MS 120 for providing cellular service, including the functions necessary for the making an AGS call generally, and for providing the Prepaid Billing Services specifically.

The high-level functional components of the MS 120 include an encoder/decoder 302, processing logic 304 and user interface 306. A client application 308 is provided on the SIM 300 that supports AGS functionality for the MS 120. In addition, the SIM 300 stores a database 310, which includes an address book, AGS contacts and/or group information.

At power-on, the MS 120 loads the client application 308 necessary to support the AGS services. This functionality provided includes the "look and feel" of the menu displays on the MS 120, as well as user interaction with the menu displays.

During operation, the encoder/decoder 302 decodes and encodes messages, and populates specific data structures in the MS 120. The encoder/decoder 302 checks the validity of the incoming messages by verifying mandatory parameters for each of the incoming messages. A message will not be processed further if the encoder/decoder 302 fails to decode the message.

The processing logic 304 handles all the AGS related functionalities. The processing logic 304 implementation is device-specific and vendor-specific, and it interacts with the other components, including the encoder/decoder 302, user interface 306, client application 308 and database 310.

The processing logic 304 provides an auto-answer mechanism for AGS calls. Specifically, when a call is received, the processing logic 304 automatically answers the call. The processing logic 304 makes use of call notification for incoming call detection and, based on various parameters received within the call notification, determines whether the call is an AGS call. If the call is an AGS call, then the processing logic 304 uses "AT" commands to answer the AGS call and turn on the speaker of the MS 120. (All of this takes place within a certain time period.) On the other hand, if the call is not an AGS call, then normal call processing is performed by the MS 120.

The processing logic 304 also provides "floor control" using DTMF tone control. In PTT calls, which are half-duplex, a determination of who may talk is based on who has the "floor." Using the processing logic 304 provided in the MS 120, appropriate DTMF tones are sent to the RTX 102 in accordance with specific key sequences (i.e., pressing and/or releasing a PTT key) that indicate whether the "floor" has been requested and/or released by the user.

In addition, the processing logic 304 provides SMS destination control based on the type of subscriber. At the time of subscriber data provisioning, if it is determined that the MS 120 will use AGS based logic, then appropriate logic is invoked in the RTX 102 to send presence messages over SMS to the MS 120. Similarly, the MS 120 is configured at the time of provisioning to receive/accept such SMS and respond to the RTX 102 appropriately.

Finally, the processing logic 304 also enables subscribers to track the presence of fellow members of the group in the network 100 on their MS 120, and provides a mechanism and API to carry-out contacts and group management operations on the MS 120, such as add member, delete member, etc.

Since most of the presence information is stored in the database 310, the database 310 is tightly integrated with the processing logic 304. The database 310 stores groups, contacts, presence and availability related information. The database 310 information essentially contains group and member information along with presence information associated with each group and member. Apart from group and member information, the database 310 also stores subscriber information, such as privileges, presence information, etc. The other components of the MS 120 may interact with the database 310 to retrieve/update the group, members and presence information for various operations. The database 310 also has pointers to the native address book on the MS 120, to provide seamless "alias" naming for contacts used with cellular calls, as well as AGS services.

The user interface 306 provides a mechanism for the user to view and manage groups, group members, contacts, presence and availability. The user interface 306 also makes it possible to invoke the AGS services from the group/contact list screens, as described in more detail below.

2.5 Advanced Group Services

The RTX 102 and MS 120 work together to provide the functionality of the Advanced Group Services for the wireless communications network 100. The specifics of this functionality are described in more detail in the following sections.

2.6 Acronyms and Messaging

In the following sections, a number of call flows are described and illustrated. These call flows use a number of different acronyms, including the following:

IAM: Initial Address Message,
ACM: Address Complete Message,
ANM: Answer Message,
REL: Release Message,
RCL: Release Complete Message,
SMS: Short Message Service,
MO_SM: Mobile originating Short Message,
FSM: Forward Short Message,
Data_SM: Data Short Message received by SMSC,
Deliver_SM: Deliver Short Message from SMSC,
MO_SM: Mobile originating Short Message,
IN: Intelligent Network,
IDP or InitialDP: Initial Detection Point,
Continue: Continue the call processing,
Connect: Connect to the new terminating number provided in the message,
IDP_SM: Initial Detection Point for SMS,
MDN: Mobile Directory Number, and
SCA: Service Centre Address in SMS network.

The voice call related messages include: Setup, Originating, Terminating, IAM, Alerting, ACM, Connect, ANM, Disconnect, REL, release, Disconnect Ack, and RCL release complete.

The SMS related message include: MO-SM, FSM (a.k.a. Fwd_SM), Data_SM, Deliver_SM, and MT_SM.

The IN messages include: IDP, Connect, Continue, release, and IDP_SM.

In general, the parameters in the voice call originating and terminating messages are calling party number (e.g. A) and called party number (e.g. B). The B party in the originating message could be a number dedicated to the RTX 102 or the MS 120. On the other hand, the A party in the terminating message could be a number dedicated to the RTX 102 or the MS 120.

The following sections describe the steps for the call flow as well as each message in the call flow.

3 Prepaid Billing Solution for Mobile Conference and PTT Services

The Prepaid Billing Solution service enables a real-time billing mechanism for a prepaid subscriber. The Prepaid Billing Solution is applicable to both mobile conferences and PTT services.

The primary benefits of the Prepaid Billing Solution are:
To bill prepaid subscribers real-time for the mobile conference and PTT services, and
To reuse the existing operator infrastructure to perform this billing.

3.1 Mobile Conference Call Flow Description

This service works with a client application in the handset 120 and the RTX 102.

The RTX 102 terminates signaling on a Signal Transfer Point (STP) and bearer connectivity on the GMSC 104.
The subscriber can make a conference call by selecting list of contacts on the handset 120.
The following call flow illustrates the steps performed:
A, B, C and D are subscribers.
Subscriber A has a Conference-Client installed on the handset 120 and A is configured on the RTX 102.
Subscriber A launches the Conference-Client, selects B, C, and D, and initiates a conference call.
The Conference-Client establishes a call to the number for the RTX 102, and the MSC 104 routes the call to the RTX 102. In this way, the Conference-Client is connected to the RTX 102.

The Conference-Client sends an SMS to the RTX 102 having the mobile numbers of group members B, C and D in the SMS. Based on this SMS, the RTX 102 terminates the legs to B, C and D.

The RTX 102 terminates the legs towards, B, C and D via the GMSC 104.

The RTX 102 bridges the call between A, B, C and D.

The two different Prepaid Billing Solution for the Mobile Conference are:
  Option 1: Prefix based solution, and
  Option 2: Charging Number based solution.

3.2 PTT Call Flow Description

This service works with a client in the handset 120 and the RTX 102.

The RTX 102 terminates signaling on STP and bearer connectivity on the GMSC 104.

The subscriber can create groups, and each group is allocated a unique group ID by the RTX 102.

Subscribers can make a PTT call to a group of people and talk in simplex mode. At any given point in time, one participant speaks others listen. When the floor is available, the floor can be occupied by anybody.

The following call flow illustrates the steps performed:
  A, B, C and D are subscribers.
  Subscriber A creates "Sales Group" with B, C and D as members.
  Subscriber A selects the Sales Group and press the PTT button on the handset 120.
  The PTT-Client on A's handset 120 dials the following number: RoutingDelimiter+TypeofCall+GroupIndex
  The serving MSC 104 initiates an InitialDP [DP2 based on Routing Delimiter] with dialed digits as [RoutingDelimiter+TypeofCall+GroupIndex] towards the RTX 102.
  The RTX 102 sends a connect message back to the originating MSC 104 with the number of the RTX 102.
  The originating MSC 104 sends an IAM towards the RTX 102. In this way, the handset 120 for Subscriber A is connected to the RTX 102.
  The RTX 102 dials out the legs towards B, C, D as follows via the GMSC 104:
    IAM [Calling=MSISDN of A+44, Called=MSISDN of B, Charging Number=A]
    IAM [Calling=MSISDN of A+44, Called=MSISDN of C, Charging Number=A]
    IAM [Calling=MSISDN of A+44, Called=MSISDN of C, Charging Number=A]
  The RTX 102 bridges the call between A, B, C and D.

Real Time prepaid billing option for PTT is:
  Option 2: Charging Number based solution 3.3 Prefix Based Billing Solution for Mobile Conference The following call flow describes Option 1, namely the prefix-based billing solution for a mobile conference, which is applicable to prepaid subscribers. Specifically, in this example, Subscriber A is prepaid subscriber and Subscriber A initiates a conference call to B, C, and D.

1. Subscriber A selects B, C and D and initiates the conference call. The client application on Subscriber A's handset 120 establishes a call to the number of the RTX 102.

2. The originating MSC 104 routes the call towards the RTX 102. Before routing it to the RTX 102, the MSC 104 identifies Subscriber A as a prepaid subscriber by putting a prefix [111] on the number of the RTX 102.

3. The client on the handset 120 forms an SMS with the numbers for B, C and D, and sends the SMS to the RTX 102 via the GMSC 104.

4. The RTX 102 reads the SMS and initiates the terminating legs towards B, C and D. The RTX 102 identifies Subscriber A as a prepaid subscriber based on the prefix [111] of the number received in the incoming IAM. If Subscriber A is prepaid, then the RTX 102 puts the same prefix [111] on the called party numbers in all IAMB sent to the GMSC 104 for all terminating legs. For example, if Subscriber A is prepaid, then the terminating legs are dialed out as: A to 111+B, A to 111+C and A to 111+D.

5. Based on the prefix [111], the GMSC 104 identifies Subscriber A as a prepaid subscriber, removes the prefix [111] from the number, and initiates a session with a prepaid server handling Subscriber A. The GMSC 104 repeats this for all the terminating legs and, as a result, Subscriber A is billed for all of the terminating legs simultaneously.

3.4 Charging Number Based Billing for Mobile Conference

The following call flow describes Option 2, namely the charging number based billing solution for a mobile conference, which is applicable to (real-time) billing subscribers. Specifically, in this example, Subscriber A is a prepaid subscriber and Subscriber A initiates a conference call to B, C, and D.

1. Subscriber A selects B, C and D and initiates the conference call. The client on the handset 120 of Subscriber A establishes a call to the number for the RTX 102.

2. The originating MSC 104 routes the call towards the RTX 102. Before routing the call to the RTX 102, the MSC 104 identifies Subscriber A as a billing subscriber and puts a prefix [111] to the number of the RTX 102.

3. The client on the handset 120 forms an SMS with the numbers for B, C and D, and sends the SMS to the RTX 102 via the GMSC 104.

4. The RTX 102 receives the SMS, and initiates the terminating legs towards B, C and D. The RTX 102 identifies Subscriber A as a billing subscriber based on the prefix [111] of the number received in the incoming IAM. While dialing the terminating legs, the RTX 102 enters the "Charging Number" in the IAM as the number of Subscriber A:
  Leg1 from RTX 102 to GMSC 104 is IAM (Calling=A, Called=B, Charging Number=A),
  Leg2 from RTX 102 to GMSC 104 is IAM (Calling=A, Called=C, Charging Number=A), and
  Leg3 from RTX 102 to GMSC 104 is IAM (Calling=A, Called=D, Charging Number=A).

5. The GMSC 104 analyzes the charging number field in the IAM and, since the Charging Number [A] is a billing subscriber, the GMSC 104 initiates an "IN-Session" with the billing server for Subscriber A. The GMSC 104 repeats this for all the legs and, as a result, Subscriber A is billed for all of the terminating legs simultaneously.

3.5 Charging Number Based Billing for PTT

The following call flow describes Option 2, namely the charging number based billing solution for a PTT, which is applicable to (real-time) billing subscribers. Specifically, in this example, Subscriber A is a prepaid subscriber and Subscriber A initiates a PTT call to B, C, and D.

1. Subscriber A selects B, C and D, and initiates the PTT call. The client on the handset 120 for Subscriber A establishes a call to: RD+CallType+GroupIndex. [RD=4-digits, Call Type=2-digits, GroupIndex=2-digits].

2. In the originating call setup, the following steps are performed:
   a. The serving MSC 104 initiates an InitialDP [DP2 based on Routing Delimiter] with dialed digits as [RoutingDelimiter+TypeofCall+GroupIndex] towards the RTX 102.
   b. The RTX 102 sends a connect message back to the originating MSC 104 with the number of the RTX 102.
   c. The originating MSC 104 sends the IAM towards the RTX 102.

3. This call reaches the serving MSC 104 and the serving MSC 104 does a "B-Party" analysis and routes the call to the RTX 102.

4. The RTX 102 receives the dial digits in the received IAM, and initiates the terminating legs towards B, C and D. While dialing the terminating legs, the RTX 102 determines whether Subscriber A is a billing subscriber and fills the "Charging Number" in the IAM:
   a. Leg1 from the RTX 102 to the GMSC 104 is IAM (Calling=A+33, Called=B, Charging Number=A),
   b. Leg2 from the RTX 102 to the GMSC 104 is IAM (Calling=A+33, Called=C, Charging Number=A), and
   c. Leg3 from the RTX 102 to the GMSC 104 is IAM (Calling=A+33, Called=D, Charging Number=A).

5. The GMSC 104 analyzes the charging number field in the IAM and, since the Charging Number [A] is a billing subscriber, the GMSC 104 initiates an "IN-Session" with the billing server for Subscriber A. The GMSC 104 repeats this for all the terminating legs and, as a result, Subscriber A is billed for all the terminating legs simultaneously.

4 Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing billing solutions for advanced group services in a mobile phone network, comprising:
   a mobile phone network for making calls between mobile phones, wherein the calls are initiated by call setup and in-band signaling within the mobile phone network and voice frames for the calls are switched between the mobile phones by at least one mobile switching center across bearer paths in the mobile phone network; and
   a real-time exchange that interfaces to at least one mobile switching center in the mobile phone network to provide the advanced group services therein;
   wherein both the real-time exchange and the mobile phones that use the advanced group services communicate with each other using the call setup and in-band signaling within the mobile phone network, such that at least one mobile switching center routes an originating leg of the advanced voice services from an originating mobile phone to the real-time exchange, the real-time exchange initiates one or more terminating legs of the advanced voice services to one or more terminating mobile phones through at least one mobile switching center, and the real-time exchange switches the voice frames for the advanced group services between the originating and terminating mobile phones across the bearer paths and through at least one mobile switching center in the mobile phone network; and
   wherein a billing mechanism is provided for a prepaid or real-time billing subscriber of the advanced group services, in that:
      the mobile switching center identifies the originating mobile phone as the prepaid or real-time subscriber to the real-time exchange when routing the originating leg of the advanced voice services to the real-time exchange,
      the real-time exchange identifies the originating mobile phone as the prepaid or real-time subscriber to the mobile switching center when routing the terminating legs of the advanced voice services to the mobile switching center, and
      the mobile switching center communicates with a billing server to bill the originating mobile phone for the originating leg and all of the terminating legs, when the originating mobile phone is identified as the prepaid or real-time subscriber.

2. The apparatus of claim 1, wherein the billing mechanism uses a prefix-based billing solution for the advanced group services used by the prepaid or real-time subscriber.

3. The apparatus of claim 2, wherein the mobile switching center identifies the originating mobile phone as the prepaid or real-time subscriber by placing a prefix on a number for the real-time exchange.

4. The apparatus of claim 3, wherein the real-time exchange identifies the originating mobile phone as the prepaid or real-time subscriber by the prefix placed on the number for the real-time exchange, and responds by placing the prefix on numbers for the terminating mobile phones.

5. The apparatus of claim 4, wherein the mobile switching center identifies the originating mobile phone as the prepaid or real-time subscriber from the prefix placed on the numbers for the terminating mobile phones.

6. The apparatus of claim 1, wherein the billing mechanism uses a charging number based billing solution for the advanced group services used by the prepaid or real-time subscriber.

7. The apparatus of claim 6, wherein the mobile switching center identifies the originating mobile phone as the prepaid or real-time subscriber by a number for the originating mobile phone placed in a charging number field for the real-time exchange.

8. The apparatus of claim 7, wherein the real-time exchange identifies the originating mobile phone as the prepaid or real-time subscriber by the number placed in the charging field for the real-time exchange, and responds by placing the number for the originating mobile phone in a charging number field for the terminating mobile phones.

9. The apparatus of claim 8, wherein the mobile switching center identifies the originating mobile phone as the prepaid or real-time subscriber from the number for the originating mobile phone placed in the charging number field for the terminating mobile phones.

10. A method for providing billing solutions for advanced group services in a mobile phone network, comprising:
   making calls between mobile phones in a mobile phone network, wherein the calls are initiated by call setup and in-band signaling within the mobile phone network and voice frames for the calls are switched between the mobile phones by at least one mobile switching center across bearer paths in the mobile phone network; and
   interfacing a real-time exchange to at least one mobile switching center in the mobile phone network to provide the advanced group services therein;
   wherein both the real-time exchange and the mobile phones that use the advanced group services communicate with each other using the call setup and in-band signaling within the mobile phone network, such that at least one mobile switching center routes an originating leg of the advanced voice services from an originating mobile phone to the real-time exchange, the real-time exchange initiates one or more terminating legs of the advanced voice services to one or more terminating mobile phones through at least one mobile switching center, and the real-time exchange switches the voice frames for the advanced group services between the originating and terminating mobile phones across the bearer paths and through at least one mobile switching center in the mobile phone network; and wherein a billing mechanism is provided for a prepaid or real-time billing subscriber of the advanced group services, in that:

the mobile switching center identifies the originating mobile phone as the prepaid or real-time subscriber to the real-time exchange when routing the originating leg of the advanced voice services to the real-time exchange, the real-time exchange identifies the originating mobile phone as the prepaid or real-time subscriber to the mobile switching center when routing the terminating legs of the advanced voice services to the mobile switching center, and the mobile switching center communicates with a billing server to bill the originating mobile phone for the originating leg and all of the terminating legs, when the originating mobile phone is identified as the prepaid or real-time subscriber.

11. The method of claim 10, wherein the billing mechanism uses a prefix-based billing solution for the advanced group services used by the prepaid or real-time subscriber.

12. The method of claim 11, wherein the mobile switching center identifies the originating mobile phone as the prepaid or real-time subscriber by placing a prefix on a number for the real-time exchange.

13. The method of claim 12, wherein the real-time exchange identifies the originating mobile phone as the prepaid or real-time subscriber by the prefix placed on the number for the real-time exchange, and responds by placing the prefix on numbers for the terminating mobile phones.

14. The method of claim 13, wherein the mobile switching center identifies the originating mobile phone as the prepaid or real-time subscriber from the prefix placed on the numbers for the terminating mobile phones.

15. The method of claim 11, wherein the real-time exchange identifies the originating mobile phone as the prepaid or real-time subscriber by a number for the originating mobile placed in a charging number field for the real-time exchange, and responds by placing the number for the originating mobile phone in a charging number field for the terminating mobile phones.

16. The method of claim 15, wherein the mobile switching center identifies the originating mobile phone as the prepaid or real-time subscriber from the number for the originating mobile placed in the charging number field for the terminating mobile phones.

17. The method of claim 10, wherein the billing mechanism uses a charging number based billing solution for the advanced group services used by the prepaid or real-time subscriber.

* * * * *